United States Patent
Bentley (10) Patent No.: US 9,964,013 B2
(45) Date of Patent: May 8, 2018

(54) EXHAUST GAS AFTERTREATMENT BYPASS SYSTEM AND METHODS

(71) Applicant: CUMMINS IP, INC., Columbus, IN (US)

(72) Inventor: Gregory Bentley, Greenwood, IN (US)

(73) Assignee: CUMMINS IP, INC., Columbus, IN (US)

( * ) Notice: Subject to any disclaimer, the term of this patent is extended or adjusted under 35 U.S.C. 154(b) by 0 days. days.

(21) Appl. No.: 15/241,560

(22) Filed: Aug. 19, 2016

(65) Prior Publication Data

US 2017/0138238 A1 May 18, 2017

Related U.S. Application Data (62) Division of application No. 14/602,748, filed on Jan. 22, 2015, now abandoned, which is a division of (Continued)

(51) Int. Cl.
*F01N 3/20* (2006.01)
*F01N 9/00* (2006.01)
(Continued)

(52) U.S. Cl.
CPC ......... *F01N 3/2053* (2013.01); *F01N 3/2066* (2013.01); *F01N 9/00* (2013.01);
(Continued)

(58) Field of Classification Search
CPC ...... F01N 3/031; F01N 3/0878; F01N 3/2053; F01N 3/2066; F01N 11/00;
(Continued)

(56) References Cited

U.S. PATENT DOCUMENTS 6,148,656 A 11/2000 Breton
6,823,660 B2 11/2004 Minami
(Continued)

FOREIGN PATENT DOCUMENTS

EP 2 332 826 6/2011
JP 2004-270574 9/2004
(Continued)

OTHER PUBLICATIONS

UK Examination Report for GB 1515728.2, dated Feb. 9, 2017, 5 Pages.
(Continued)

*Primary Examiner* — Audrey K Bradley
(74) *Attorney, Agent, or Firm* — Foley & Lardner LLP (57) ABSTRACT

A method for protecting an exhaust aftertreatment system of an internal combustion engine from deterioration by selectively diverting exhaust gasses from the engine away from a component of the exhaust aftertreatment system includes assessing a status of an operating condition associated with a physical condition of the component of the internal combustion engine. The status of the operating condition is compared with a threshold value that corresponds with deterioration of the physical condition of the component. A valve upstream of the component is moved to a first position to open a bypass fluid path directing exhaust gasses around the component when the status of the operating condition meets the threshold value to reduce deterioration of the component. The valve is moved to a second position to close the bypass fluid path thereby directing exhaust gasses to the component when the status of the operating condition does not meet the threshold.

17 Claims, 6 Drawing Sheets

Related U.S. Application Data application No. 13/789,345, filed on Mar. 7, 2013, now abandoned.

(51) Int. Cl.
*F01N 11/00* (2006.01)
*F01N 13/00* (2010.01)

(52) U.S. Cl.
CPC ............ *F01N 11/00* (2013.01); *F01N 11/002* (2013.01); *F01N 13/017* (2014.06); *F01N 2410/02* (2013.01); *F01N 2550/02* (2013.01); *F01N 2550/10* (2013.01); *F01N 2900/08* (2013.01); *F01N 2900/1404* (2013.01); *Y02T 10/24* (2013.01); *Y02T 10/47* (2013.01)

(58) Field of Classification Search
CPC ............ F01N 2410/00; F01N 2410/02; F01N 2550/02; F01N 2550/10
See application file for complete search history.

(56) References Cited

U.S. PATENT DOCUMENTS

| | | |
|---|---|---|
| 6,871,490 B2 | 3/2005 | Liang et al. |
| 7,251,929 B2 | 8/2007 | Hu et al. |
| 7,263,824 B2 | 9/2007 | Bellinger et al. |
| 8,061,121 B2 | 11/2011 | Haugen |
| 2007/0143007 A1* | 6/2007 | Durand ............... F02D 41/0025 701/32.3 |
| 2008/0178576 A1 | 7/2008 | Meier et al. |
| 2008/0289321 A1 | 11/2008 | Lu et al. |
| 2008/0295499 A1 | 12/2008 | Driscoll et al. |
| 2009/0114196 A1* | 5/2009 | Haugen ............... F02D 19/0665 123/575 |
| 2009/0199537 A1 | 8/2009 | Sisken et al. |
| 2009/0260349 A1 | 10/2009 | Gandhi et al. |
| 2010/0146946 A1 | 6/2010 | Andersson et al. |
| 2011/0058999 A1 | 3/2011 | Ettireddy et al. |
| 2011/0314794 A1 | 12/2011 | Geyer |
| 2012/0096854 A1 | 4/2012 | Kiran |
| 2013/0067887 A1* | 3/2013 | Heverley, III ........... B61O 5/04 60/273 |
| 2014/0010744 A1 | 1/2014 | Ruona et al. |

FOREIGN PATENT DOCUMENTS

| | | | |
|---|---|---|---|
| JP | 2006266144 A | * 10/2006 | |
| JP | 2010-185337 | 8/2010 | |
| WO | WO 2013007467 A1 | * 1/2013 | ......... B01D 53/9468 |
| WO | WO 2013/112101 | 8/2013 | |

OTHER PUBLICATIONS

UK Examination Report for GB1515728.2, dated Nov. 21, 2016, 4 pages.

* cited by examiner

EXHAUST GAS AFTERTREATMENT BYPASS SYSTEM AND METHODS

CROSS-REFERENCE TO RELATED PATENT APPLICATIONS

This application is a divisional of U.S. patent application Ser. No. 14/602,749, filed Jan. 22, 2015, which is a divisional of U.S. patent application Ser. No. 13/789,345, filed Mar. 7, 2013. The contents of both applications are hereby incorporated herein by reference in their entirety.

FIELD

This disclosure relates generally to exhaust aftertreatment systems for internal combustion engines, and more particularly to a bypass system and method for protecting exhaust aftertreatment devices from harmful environmental or operating conditions.

BACKGROUND

Exhaust aftertreatment systems include components used to process exhaust gasses produced by an internal combustion engine for the purpose of reducing harmful exhaust emissions. Some aftertreatment system components, such as diesel oxidation catalysts (DOC) and selective catalytic reduction (SCR) catalysts, use catalytic materials to chemically convert potentially harmful exhaust emissions into other less harmful emission products. Such catalyst-based exhaust aftertreatment system components are desirable for their ability to efficiently control emissions. Unfortunately, some catalyst-based exhaust aftertreatment system components are also susceptible to damage from adverse operational and environmental conditions For example, many components have an acceptable operating temperature range. Exceeding the upper limits of the temperature range can result in release of undesirable oxides, such as pentoxide being released from a Vanadium-based catalyst. On the other hand, operating at temperatures below the lower limits of the temperature range can result in unburned hydrocarbon being trapped or absorbed in the catalyst. Significant quantities of unburned hydrocarbon can become combustible, and pose a threat to aftertreatment hardware and the environment, due to uncontrolled thermal events Another potential hazard to catalyst-based exhaust aftertreatment system components is the use of high sulfur-content fuels. Many of the catalysts used in exhaust aftertreatment systems include catalytic materials capable of oxidizing sulfur. Consequently, due to sulfur poisoning, fuels having high sulfur content can overwhelm and deactivate a catalyst configured to oxidize other emissions components.

Engine failures are yet another hazard to the components of exhaust aftertreatment systems. A bearing seal failure, for instance, might release oil into the exhaust line that could damage the components of an exhaust aftertreatment system.

SUMMARY

The subject matter of the present application has been developed in response to the present state of the art, and in particular, in response to the problems and needs in exhaust aftertreatment art that have not yet been fully solved by currently available exhaust aftertreatment systems. For example, the inventors of the subject matter of the present application have recognized that, given the high costs of exhaust aftertreatment systems, it would be advantageous to have a bypass system that would protect the aftertreatment components from operational and environmental hazards that might cause damage to the components. Additionally, the inventors of the subject matter of the present application have recognized that a control system and methodology for bypassing one or more components of an exhaust aftertreatment system would extend the service life of the components when operational or environmental hazards threaten the components.

Accordingly, in one embodiment, the subject matter of the present application has been developed to provide a method for protecting an exhaust aftertreatment system of an internal combustion engine from deterioration by selectively diverting exhaust gasses from the engine away from a component of the exhaust aftertreatment system. The method includes assessing a status of an operating condition associated with a physical condition of the component of the internal combustion engine. The status of the operating condition is compared with a threshold value that corresponds with deterioration of the physical condition of the component. A valve upstream of the component is moved to a first position to open a bypass fluid path directing exhaust gasses around the component when the status of the operating condition meets the threshold value to reduce deterioration of the component. The valve is moved to a second position to close the bypass fluid path thereby directing exhaust gasses to the component when the status of the operating condition does not meet the threshold value.

In one implementation of the method, assessing the status of the operating condition includes assessing a temperature of the exhaust gasses and comparing the temperature to a lower temperature threshold value below which the exhaust gasses include a predetermined level of unburned hydrocarbons.

In another implementation, assessing the status of the operating condition includes assessing a temperature of the exhaust gasses and comparing the temperature to an upper temperature threshold value above which the component degrades and produces harmful byproducts, such as pentoxide.

In another implementation of the method, assessing the status of the operating condition includes assessing a geographical location of the internal combustion engine and comparing the geographical location to a threshold value includes comparing the geographical location of the engine to geographical locations that do not require emissions controls for internal combustion engines.

In yet another implementation of the method, assessing the status of the operating condition includes assessing a chemical formulation of fuel used by the internal combustion engine and comparing fuel chemistry to a threshold value includes comparing the fuel chemistry to chemicals that deteriorate the component, such as sulfur.

The step of moving the valve to the first position based on the threshold comparison can also be overridden by a user by manually moving the valve to the second position to close the first fluid path and open the second fluid path to bypass the exhaust aftertreatment device.

Additionally, according to another embodiment, the subject matter of the present application has been developed to provide an apparatus for bypassing an exhaust aftertreatment device of an internal combustion engine to protect a selective catalytic reducer or reduction (SCR) component of the exhaust aftertreatment device from deterioration. The apparatus includes a flow control valve operable to open and close a bypass fluid path wherein exhaust gasses from the engine bypass the exhaust after treatment device when the valve is in the open position and the exhaust gasses flow through the exhaust aftertreatment device when the valve is in the closed position. A sampling module samples an operating condition of the internal combustion engine that is associated with a physical condition of the SCR component. A comparison module compares the operating condition with a threshold value that corresponds with deterioration of the physical condition of the SCR component. A control module operates the flow control valve to open the bypass fluid path if the operating condition does not meet the threshold condition and to close the bypass fluid path if the operating condition meets the threshold condition.

In one implementation of the apparatus a user interface is associated with the control module. The user interface is configured to accept user input to override the control module control of the flow control valve and manually open the valve to the bypass fluid path to bypass the exhaust aftertreatment device.

In one embodiment of an internal combustion engine, the engine includes an exhaust aftertreatment system including a SCR component in exhaust receiving communication with the internal combustion engine. A bypass system is operatively associated with the exhaust aftertreatment system and operates to bypass the SCR component when an operating condition of the internal combustion engine that corresponds with deterioration of a physical condition of the SCR component is detected.

In one implementation, the bypass system includes a flow control valve operable to open and close a bypass fluid path with exhaust gasses from the engine bypassing the exhaust after treatment device when the valve is in the open position and the exhaust gasses flow through the exhaust aftertreatment device when the valve is in the closed position. The bypass system also includes a controller that determines whether the flow control valve is open to the bypass fluid path by sampling the operating condition of the internal combustion engine that is associated with the physical condition of the SCR component. The controller compares the sampling of the operating condition with a threshold value that corresponds with deterioration of the physical condition of the SCR component.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
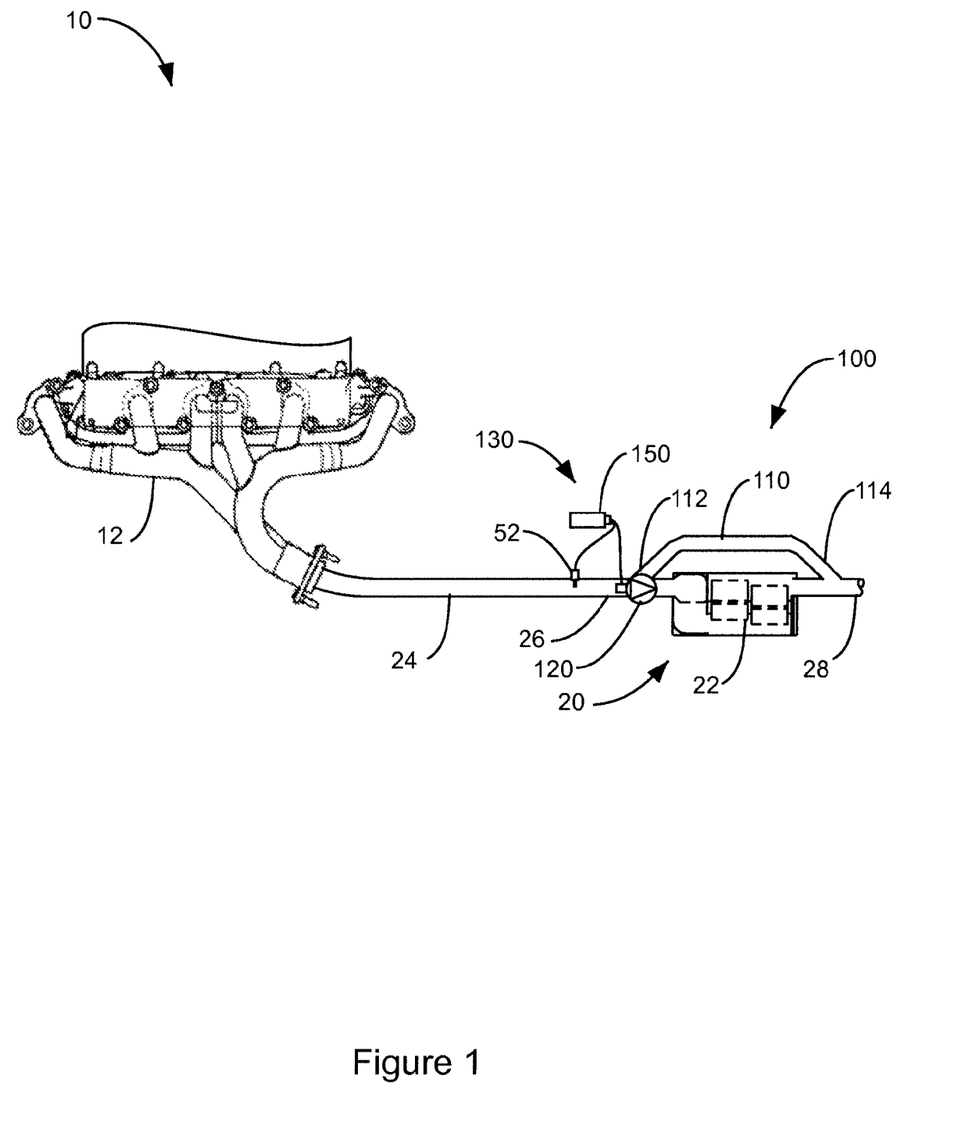
FIG. 1 is schematic representation of an internal combustion engine according to one embodiment of the present invention shown with an exhaust aftertreatment bypass system coupled to an exhaust system of the engine.

Referring to FIG. 1, according to one embodiment, an internal combustion engine 10 is shown with a bypass system 100 operatively associated with an exhaust aftertreatment system 20 that is in exhaust receiving communication with an exhaust manifold 12 of the internal combustion engine. The bypass system 100 is configured to protect an exhaust aftertreatment component 22 from potentially harmful operational and environmental conditions.

Generally, the bypass system 100 forms part of the exhaust aftertreatment system 20, which is configured to reduce harmful emissions in exhaust gasses generated by the internal combustion engine 10. The exhaust aftertreatment system 20 includes one or more components (e.g., the exhaust aftertreatment component 22) configured to treat the exhaust gas in a particular way. The exhaust aftertreatment system 20 also includes a main exhaust line 24 that provides exhaust gas to the one or more components prior to being treated and directs exhaust gas away from the one or more components after being treated. Accordingly, the main exhaust line 24 includes an upstream section 26 (e.g., upstream of the components) and a downstream section 28 (e.g., downstream of the components).

The components 22 that treat the exhaust gas include a catalyst based treatment device that has a finite useful life based on a catalytic chemical reaction with the exhaust gasses that remove undesirable emissions from the exhaust gasses. Thus, the more exposure the component 22 has to exhaust gasses, the more the component will deteriorate and the shorter the component's useful life will be. For this reason, it is desirable to control exposure of the catalyst component 22 to the exhaust gasses to maximize the useful life of the component. In the embodiments described herein, the component 22 can include a selective catalytic reducer (SCR), a selective catalytic reducer coated filter, a diesel oxidation catalyst (DOC), a diesel particulate filter (DPF) with a selective catalytic reducer, and the like.

Hence, to protect the component 22 from unnecessary exposure to the exhaust gasses, the bypass system 100 includes a bypass line 110 with an inlet 112 fluidly coupleable to the upstream section 26 of the main exhaust line 24 and an outlet 114 fluidly coupleable to the downstream section 28 of the main exhaust line. The bypass system 100 also includes a flow control valve 120 that is operable to divert exhaust gas flow around the exhaust aftertreatment component 22 via the bypass line 110.

Figure 2:
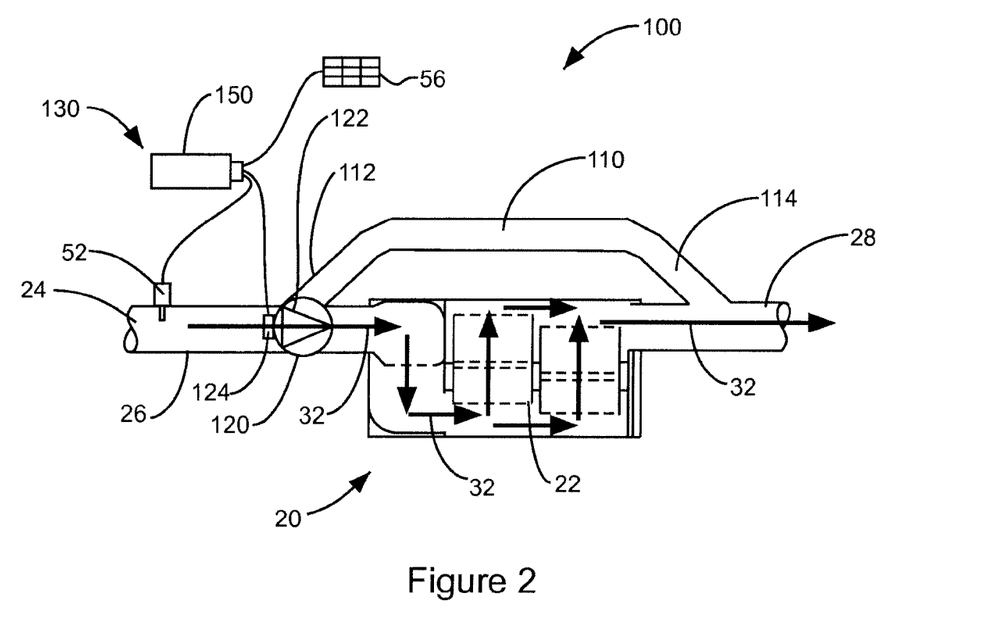
FIG. 2 is a schematic representation of an exhaust aftertreatment bypass system according to one embodiment of the present application, shown with a flow control valve directing flow into a first fluid flow pathway.
Figure 3:
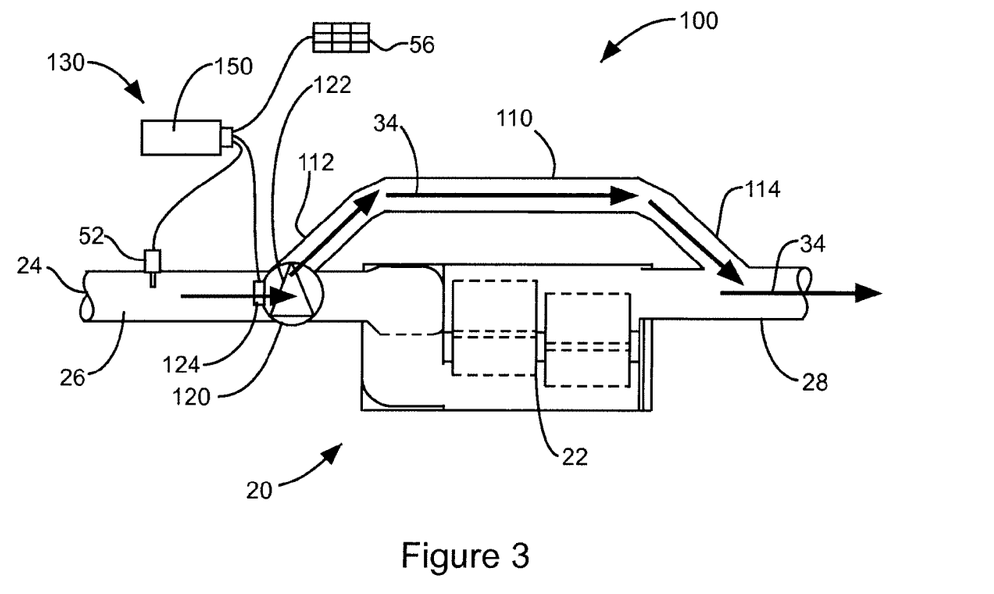
FIG. 3 is a schematic representation of the bypass system of FIG. 1 shown with the flow control valve directing flow into a second fluid flow pathway.

Referring to FIGS. 2 and 3, the bypass system 100 is shown with the flow control valve 120 disposed in the upstream section 26 of the main exhaust line 24 proximate the inlet 112 to the bypass line 110. The flow control valve 120 is actuatable between at least first and second positions. As shown in FIG. 2, in the first position (e.g., closed position), the flow control valve 120 defines a first fluid pathway extending from the upstream section 26 of the main exhaust line 24, through the flow control valve 120, and into the aftertreatment component 22. In other words, the flow control valve 120 in the closed position fluidly couples the upstream section 26 of the main exhaust line 24 with the aftertreatment component 22 such that exhaust gas, indicated by directional arrow 32, flows from the upstream section 26 into the aftertreatment component 22.

In contrast, as shown in FIG. 3, in the second position (e.g., open position), the flow control valve 120 at least partially blocks the first fluid pathway 32 to the aftertreatment component 22 and defines a second fluid pathway extending from the upstream section 26 of the main exhaust line 24, through the flow control valve 120, around the aftertreatment component 22, and into the downstream section 28 of the main exhaust line. In other words, the flow control valve 120 in the open position fluidly couples the upstream section 26 with the downstream section 28 while bypassing the component 22 such that exhaust gas, indicated by directional arrow 34, flows from the upstream section 26 directly into the downstream section 28. Although not shown, the downstream section 28 of the main exhaust line may be coupled to a tailpipe of the aftertreatment system.

The flow control valve 120 can be a gate valve 122, a ball valve, a check valve a globe valve, a butterfly valve or other similar type valve configured to direct the flow of gas based fluids as known in the art. Additionally, the flow control valve 120 can have an actuator 124 that can move the valve between the first position and the second position. The actuator 124 can receive power from an electronic, pneumatic, or vacuum source.

A controller 130 may be designed to provide a performance status to an on-board diagnostic system 150, or OBD 150. The OBD 150 may convey the status to a user such as a driver of the vehicle containing the engine system 10 (FIG. 1), for example, with a light or LED, an auditory signal or alarm, an analog gauge, a digital readout, or the like. In the embodiment shown in FIGS. 2 and 3, the controller 130 is in electronic communication with the flow control valve 120 to control movement of the flow control valve 120 between the first position and the second position.

Figure 4:
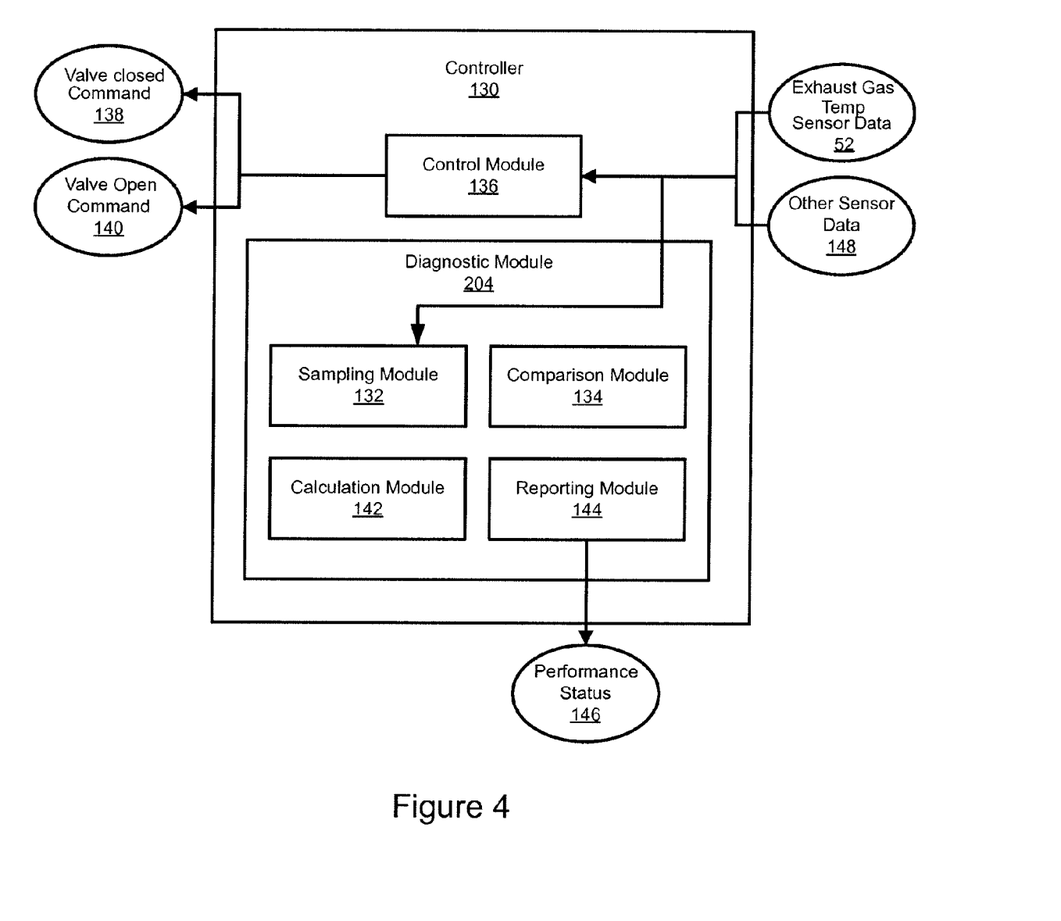
FIG. 4 is a schematic block diagram of a controller of the engine system of FIG. 1 in accordance with one representative embodiment.

Referring to FIG. 4, the controller 130 may include various modules for controlling the operation of the exhaust aftertreatment system 20. For example, the controller 130 may include one or more modules for controlling the operation of the bypass system 100. As embodied in FIGS. 2 and 3, the controller 130 includes a sampling module 132, a comparison module 134, and a control module 136. The control module 136 may control the ordinary operation of the bypass system 100 and the more particularly the flow control valve 120 by providing instruction to move the valve to either the first position (e.g., closed position) 138 or the second position (e.g., open position) 140.

The sampling module 132 may, at desired times, sample an operating condition of the internal combustion engine and the aftertreatment component 22 that is associated with a physical condition of the component 22. The sampling module can be a physical sensor 52 (FIGS. 2 and 3), such as a thermocouple, a virtual sensor, and the like. The sampling module 132 sends data regarding the sampled condition to the comparison module 134 for analysis.

The comparison module 134 may include a processor with logic and instructions for comparing data from the sampling module 132 with a threshold value of the operating condition being sampled. When the data from the sampling module 132 exceeds the threshold value, the comparison module 134 informs the control module 136 which sends instructions 140 to the bypass system 100 to move the valve 120 to the second position to bypass the aftertreatment component 22. When the data from the sampling module 132 meets the threshold value, the comparison module 134 informs the control module 136 which sends instructions 138 to the bypass system 100 to move the flow control valve 120 to the first position to allow the exhaust gasses to flow through the aftertreatment component 22.

The controller 130 and its various modular components may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

While not specifically illustrated and described with reference to FIG. 4, the controller 130 can include additional modules for conducting other control system functions. For example, the controller can include a calculation module 142 and a reporting module 144. The reporting module 144 can report the performance status of the various modules in the controller 130 to a user via an output device 146.

Additionally, the sampling module 132 can receive data from multiple sources such as additional sensors 148 that sample other operating conditions of the internal combustion engine that can have a deteriorating effect on the aftertreatment component 22. For example, the additional sensors 148 can sample an upper temperature of the exhaust gasses, a lower temperature of the exhaust gasses, a sulfur content of the fuel and exhaust gasses, and a global positioning sensor (GPS) location of the engine during operation as described below.

Although not shown in the Figures, other sensors (e.g. OBDII sensors) located throughout the engine can be used to detect engine performance problems that may adversely affect the SCR device, such as a bearing seal failure that releases engine oil into the exhaust system and the aftertreatment system. In such cases, the controller can receive data from the engine sensors and turn the exhaust stream to the bypass pathway in order to prevent damage to the catalyst due to the engine performance problems.

Returning to FIG. 4, it will be appreciated that since the exhaust gasses pass through and are treated by the exhaust aftertreatment device 20, the physical properties of the exhaust gasses can have a deteriorating effect on the exhaust aftertreatment component 22 that can shorten the service life of the aftertreatment component. For example, in catalyst based exhaust aftertreatment devices such as SCR devices and SCR coated filters, temperature of the exhaust gasses can result in undesirable and even dangerous operating conditions for the SCR. If the temperature of the exhaust gasses is too high, the catalyst in the SCR device can produce undesirable oxides, such as pentoxide from a vanadia based catalyst, which are produced at an unacceptable rate at temperatures of around 550 degrees C. Moreover, if the temperature exceeds an even higher threshold, a vanadia based catalyst may be rendered useless. Other materials used as catalysts in SCR devices, as known in the art, may also degrade, produce harmful byproducts, or be rendered useless at relatively high temperatures.

Consequently, the controller 132 includes a sensor 52, real or virtual, that samples an upper temperature of the exhaust gasses and a sampling module 132 that receives the sensor data. The sampling module 132 sends the sampled temperature data to the comparison module 134 where the data is compared to a high temperature threshold. In one aspect, the high temperature threshold is set at a temperature that is below the temperature (e.g., 550 degrees C.) at which harmful byproducts, such as pentoxides, may be produced at an unacceptable rate. In another aspect, the high temperature threshold is set at a temperature that is below the temperature at which the catalyst is rendered useless by overheating. The comparison module 134 sends the comparison results to the control module 136 to move the flow control valve 120 to the second position to bypass the exhaust aftertreatment device 20 if the temperature exceeds the high temperature threshold, thereby protecting the aftertreatment component 22 from an undesirable production of harmful byproducts, such as pentoxides, or damage from heat that may render the catalyst useless.

On the other hand, if the exhaust gas temperatures are too low, the exhaust gasses may contain an unacceptably high amount of unburned hydrocarbons. Large quantities of unburned hydrocarbons can overwhelm the catalyst such that the catalyst leaves residual unburned hydrocarbons in the exhaust aftertreatment device 20. Unburned hydrocarbons affect the efficiency of the catalyst and can create an undesirable thermal event if enough accumulate within the aftertreatment device 20. Therefore, a high unburned hydrocarbon rate in the exhaust gas can result in a high unburned hydrocarbon adsorption rate on the aftertreatment device 20. However, the unburned hydrocarbon production rate may be, but is not necessarily, equal to or proportional to the unburned hydrocarbon device adsorption rate. Accordingly, in some implementations, the sensed or estimated rate of accumulation or adsorption of unburned hydrocarbons on the device 20 relative to a threshold can be another factor controlling the operation of the exhaust bypass valve.

Accordingly, the controller 130 includes a virtual or physical sensor 52 to detect a low temperature of the exhaust gasses which would indicate the presence of unburned hydrocarbons, a virtual or physical sensor that samples for unburned hydrocarbon, a virtual or physical sensor that samples for both low temperature and for unburned hydrocarbons, or a virtual or physical that determines an accumulation or adsorption rate of unburned hydrocarbons on a catalyst or other aftertreatment device. The controller also includes a sampling module 132 that receives the data from the sensor. The sampling module 132 sends the sampled temperature or unburned hydrocarbon data to the comparison module 134 where the data is compared to a low temperature threshold or an unburned hydrocarbon threshold respectively. In one aspect, the low temperature threshold is set at temperature at which hydrocarbons are known to accumulate in the exhaust aftertreatment devices at an unacceptable rate. In another aspect the unburned hydrocarbon threshold is set at a level at which unburned hydrocarbons are known to interfere with the catalyst material in the SCR. The comparison module 134 sends the comparison results to the control module 136 to move the flow control valve 120 to the second position to bypass the exhaust aftertreatment device 20 if the temperature falls below the low temperature threshold or the unburned hydrocarbon rate exceeds the unburned hydrocarbon threshold level, thereby protecting the aftertreatment component 22 from an undesirable buildup of unburned hydrocarbons.

Another physical property of the exhaust gasses that can have a deteriorating effect on the exhaust aftertreatment component 22 is the presence of sulfur in the exhaust gasses. Some petroleum based fuels have a high sulfur content. Unfortunately, exhaust from high sulfur content fuels is also high in sulfur. Sulfur is also oxidized by catalyst based exhaust aftertreatment devices and can overwhelm the catalyst causing "sulfur poisoning" of the catalyst wherein the catalyst is rendered useless.

Therefore, the controller 130 includes a sensor 148 that samples the sulfur content of the exhaust gasses or the fuel and a sampling module 132 that receives the sensor data. The sampling module 132 sends the sampled sulfur content data to the comparison module 134 where the data is compared to a sulfur content threshold value. The comparison module 134 sends the comparison results to the control module 136 to move the flow control valve 120 to the second position to bypass the exhaust aftertreatment device 20 if the sulfur content is above the sulfur content threshold, thereby protecting the aftertreatment component 22 from an undesirable buildup of sulfur within the aftertreatment device.

Yet another operating parameter that can have a deteriorating effect on the exhaust aftertreatment component 22 is operation of the exhaust aftertreatment device when control of emissions is not needed. For example, some geographical areas of the world do not have emissions regulations and being able to bypass the exhaust aftertreatment device 20 when traveling in these areas can extend the service life of the aftertreatment device.

Hence, the controller 130 includes a sensor 148 that samples the geographic location of the internal combustion engine from a global positioning sensor (GPS). The sampling module 132 sends the GPS data to the comparison module 134 where the data is compared to a GPS threshold value. The comparison module 134 sends the comparison results to the control module 136 to move the flow control valve 120. If the GPS location is found within a geographical area that requires exhaust emission controls, then the control module 136 sends a signal to the actuator 124 to move or maintain the flow control valve 120 in the first position opening the first fluid path 32 which directs flow through the after treatment device 20. If the GPS location is in a geographical area that does not require exhaust emissions control, the control module 136 sends a signal to move the flow control valve 120 to the second position directing flow to the second flow path that bypasses the exhaust aftertreatment device 20.

The flow control valve 120 can also be manually opened or closed thereby overriding the controller 130. In one implementation, the actuator 124 on the flow control valve can be manually adjusted to override the controller 130 and move the flow control valve 120 between the first position and the second position. In another implementation, the controller 130 can receive input data directly from a user through a user interface 56 (FIGS. 2 and 3). The user interface 56 can be a physical interface, such as a keypad, or a virtual interface, as known in the art. Through the user interface 56, the user can override the controller 130 and direct the controller 130 to move the flow control valve 120 to the first or second position as desired. In either case, the bypass system 100 described herein provides a bypass pathway 110 that can be selectively opened or closed by the user in order to protect and preserve the life of the exhaust aftertreatment component 22.

Figure 5:
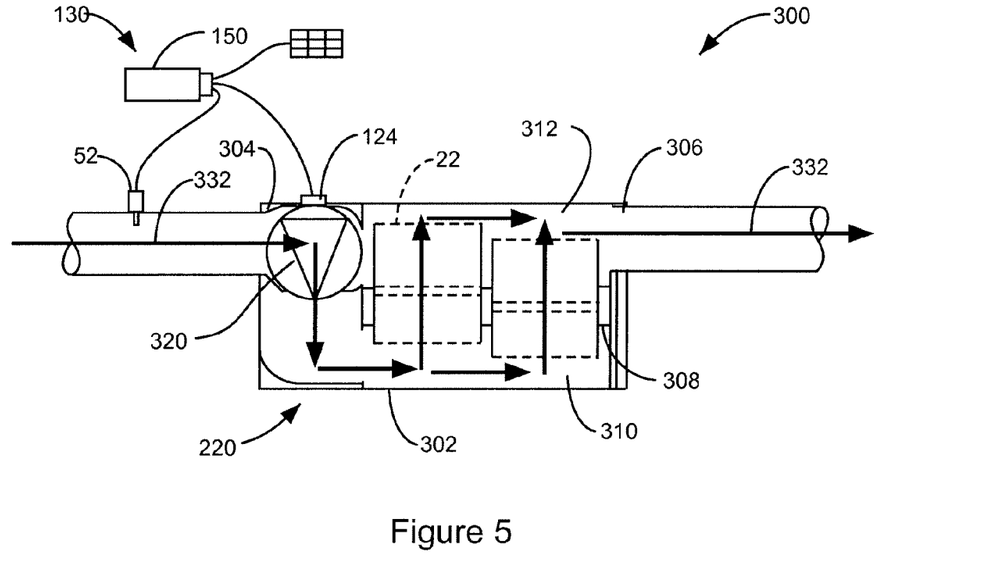
FIG. 5 is a schematic representation of an exhaust aftertreatment bypass system according to another embodiment shown with a flow control valve directing flow into a first fluid flow pathway.
Figure 6:
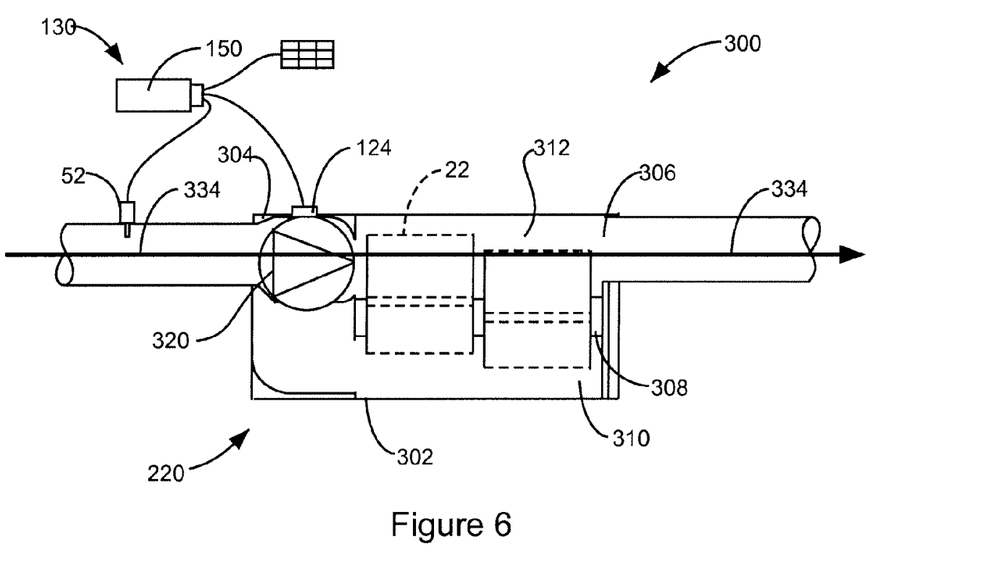
FIG. 6 is a schematic representation of the bypass system of FIG. 3 shown with the flow control valve directing flow into a second fluid flow pathway.

Referring to FIGS. 5 and 6, a bypass system, indicated generally at 300, is shown in accordance with another embodiment for use in protecting an exhaust aftertreatment system 220 that is in exhaust receiving communication with an exhaust manifold of an internal combustion engine (not shown). The bypass system is similar in many respects to the bypass system 100 described above and shown in FIGS. 1-4. The bypass system 300 is configured to protect the exhaust aftertreatment component 22 from potentially harmful operational and environmental conditions.

The bypass system 300 forms part of the exhaust aftertreatment system 220. The exhaust aftertreatment system 220 includes one or more components (e.g. the exhaust aftertreatment component 22) configured to treat the exhaust gas in a particular way. The components 22 that treat the exhaust gas include a catalyst based treatment device, such as an SCR, SCR coated filter, and the like, that have a finite useful life based on a catalytic chemical reaction with the exhaust gasses that remove undesirable emissions from the exhaust gasses.

Accordingly, to protect the component 22 from unnecessary exposure to the exhaust gasses, the bypass system 300 includes a housing 302 with an inlet 304 and an outlet 306. The aftertreatment component 22 is disposed within the housing 302 and is configured to receive exhaust gasses from the inlet 304 and to direct treated gasses to the outlet 306.

A partition 308 is disposed within the housing 302 and separates the housing into an inlet side 310 and an outlet side 312. The partition 308 restricts flow from the inlet side 310 to the outlet side 312 such that flow of exhaust gasses passes through the aftertreatment component 22 and to the outlet 306.

A flow control valve 320 is disposed in the housing 302 adjacent the inlet 304 upstream from the aftertreatment component 22. The flow control valve 320 is actuatable between at least first and second positions. As shown in FIG. 5, in the first position (e.g. closed position) the flow control valve 320 defines a first fluid pathway extending from the inlet, through the flow control valve and into the aftertreatment component 22. In other words, when the flow control valve 320 is in the closed position, exhaust gasses, indicated by directional arrow 332, flow through the valve 320 to the inlet side 310 of the housing 302, and into the aftertreatment component 22.

In contrast, as shown in FIG. 6, in the second position (e.g. open position) the flow control valve 320 at least partially blocks the first fluid pathway 332 to the aftertreatment component 22 and defines a second fluid pathway extending from the inlet side 304 of the housing 302, around the aftertreatment component 22, and into the outlet side 306 of the housing 302. In other words, the flow control valve 320 in the open position fluidly couples the inlet side 304 of the housing 302 with the outlet side 306 of the housing 302 while bypassing the component 22 such that exhaust gas, indicated by directional arrow 334, flows through the housing 302 without flowing through the aftertreatment component 22.

The bypass system 300 also includes the controller 130 described above and shown in detail in FIG. 4. The controller 130 is electronically coupled to the flow control valve 320 to control movement of the flow control valve 320 between the first position and the second position. In the embodiment shown in FIGS. 5 and 6, the controller sends a signal to the actuator 124 to move the flow control valve 320 to the desired position.

Figure 7:
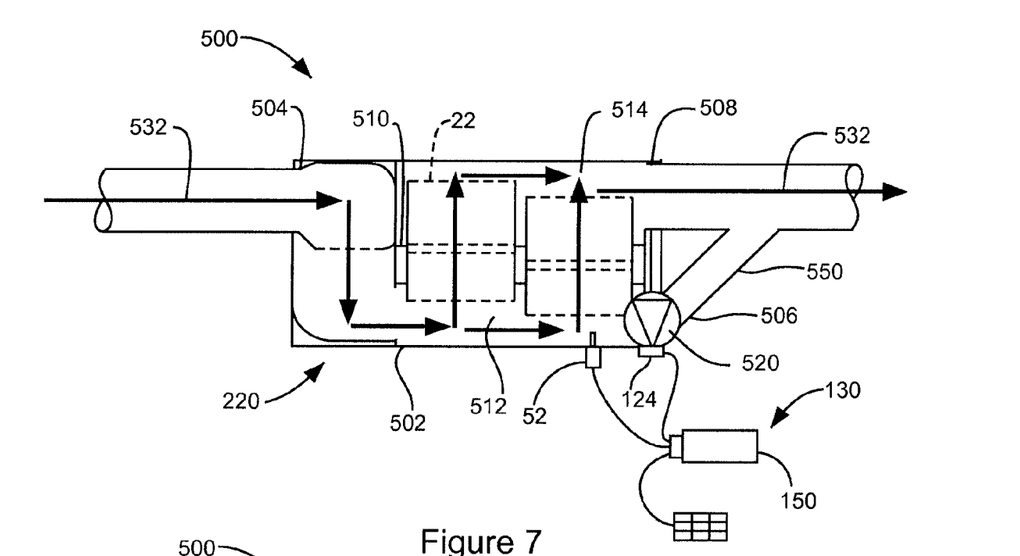
FIG. 7 is a schematic representation of an exhaust aftertreatment bypass system according to another embodiment shown with a flow control valve directing flow into a first fluid flow pathway.
Figure 8:
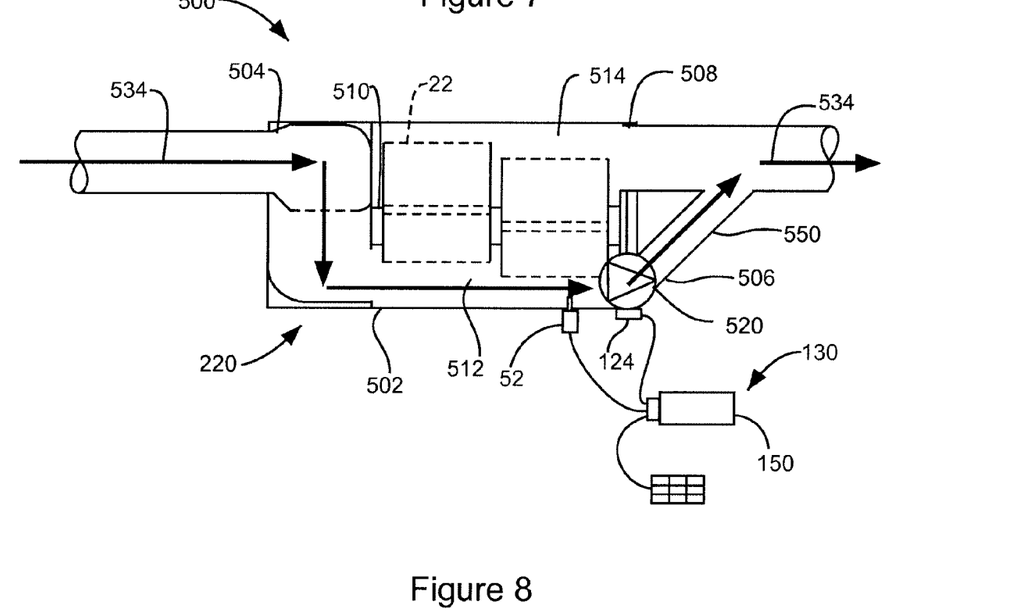
FIG. 8 is a schematic representation of the bypass device of FIG. 5 shown with the flow control valve directing flow to a second fluid flow pathway.

Referring to FIGS. 7 and 8, a bypass system, indicated generally at 500, is shown in accordance with another embodiment for use in protecting an exhaust aftertreatment system 220 that is in exhaust receiving communication with an exhaust manifold of an internal combustion engine (not shown). The bypass system is similar in many respects to the bypass systems 100 and 300 described above and shown in FIGS. 1-6. The bypass system 500 is configured to protect the exhaust aftertreatment component 22 from potentially harmful operational and environmental conditions.

The bypass system 500 forms part of the exhaust aftertreatment system 220. The exhaust aftertreatment system 220 includes one or more components (e.g. the exhaust aftertreatment component 22) configured to treat the exhaust gas in a particular way. The components 22 that treat the exhaust gas include a catalyst based treatment device, such as an SCR, SCR coated filter, and the like, that have a finite useful life based on a catalytic chemical reaction with the exhaust gasses that remove undesirable emissions from the exhaust gasses.

Accordingly, to protect the component 22 from unnecessary exposure to the exhaust gasses, the bypass system 500 includes a housing 502 with an inlet 504, a bypass outlet 506 and an aftertreatment outlet 508. The aftertreatment component 22 is disposed within the housing 502 and is configured to receive exhaust gasses from the inlet 504 and to direct treated gasses to the aftertreatment outlet 508.

A partition 510 is disposed within the housing 502 and separates the housing into an inlet side 512 and an outlet side 514. The partition 510 restricts flow from the inlet side 512 to the outlet side 514 such that flow of exhaust gasses passes through the aftertreatment component 22 to the aftertreatment outlet 508 when the bypass outlet 506 is closed by the flow control valve 520.

The flow control valve 520 is disposed in the housing 502 adjacent the bypass outlet 506 upstream from the aftertreatment component 22. The flow control valve 520 is actuatable between at least first and second positions. As shown in FIG. 7, in the first position (e.g. closed position) the flow control valve 520 closes the bypass outlet 506 and defines a first fluid pathway extending from the inlet 504 through the aftertreatment component 22 to the aftertreatment outlet 508. In other words, when the flow control valve 520 is in the closed position, exhaust gasses, indicated by the directional arrow at 532, flow through into the inlet side of the housing and into the aftertreatment component 22.

In contrast, as shown in FIG. 8, in the second position (e.g. open position) the flow control valve 520 opens a bypass exhaust pipe 550 that is downstream of the aftertreatment component 22 and defines a second fluid pathway extending from the inlet side 512 of the housing 502, past the aftertreatment component 22, through the flow control valve 520 and into bypass exhaust pipe 550. In other words, in the open position the flow control valve 520 fluidly couples the inlet side 512 of the housing 502 with the bypass exhaust pipe 550 such that exhaust gas, indicated by directional arrow 534, flows through the housing 302 without flowing through the aftertreatment component 22.

While the aftertreatment component 22 is not closed off by the flow control valve 520 when the flow control valve is in the second position, back pressure from the aftertreatment component 22 is higher in the bypass exhaust pipe 550 than in the aftertreatment component 22. Consequently, exhaust gasses will tend to flow through the flow control valve 550 and into the bypass exhaust pipe 550 instead of the aftertreatment component 22 since the exhaust bypass pipe 550 is the path of least resistance for the exhaust gasses. Thus, the second fluid pathway effectively bypasses the aftertreatment component 22 when the flow control valve 520 is in the second position.

The bypass system 500 also includes the controller 130 described above and shown in detail in FIG. 4. The controller 130 is electronically coupled to the flow control valve 520 to control movement of the flow control valve 520 between the first position and the second position. In the embodiment shown in FIGS. 7 and 8, the controller 130 sends a signal to the actuator 124 to move the flow control valve 520 to the desired position.

Figure 9:
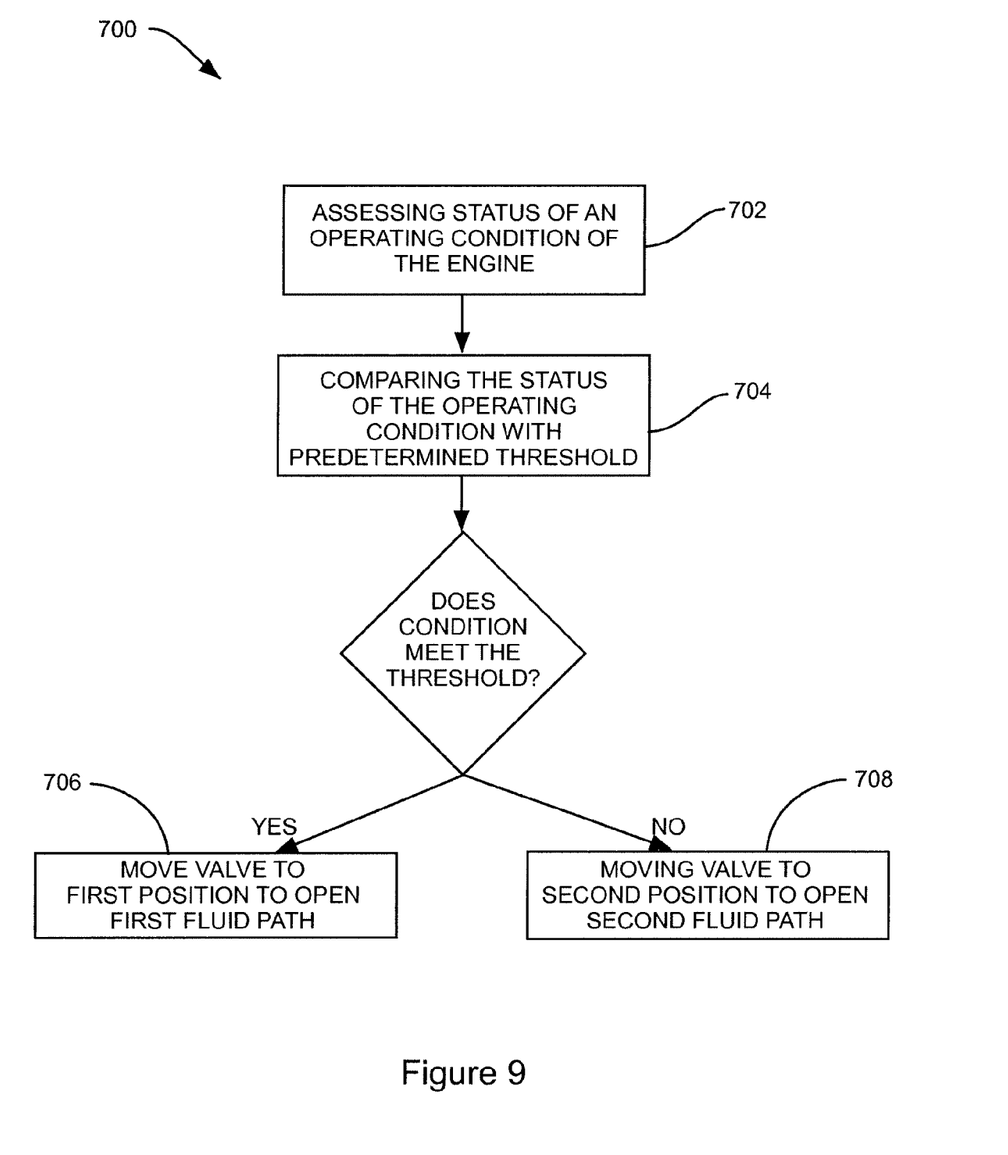
FIG. 9 is a flow chart of a method for protecting an exhaust aftertreatment device of an internal combustion engine system using a bypass device in accordance with another embodiment of the present application.

Referring to FIG. 9, a method for protecting an exhaust aftertreatment system of an internal combustion engine, indicated generally at 700, is shown in accordance with another embodiment of the present invention. The method for protecting the exhaust aftertreatment system 700 selectively diverts exhaust gasses from the engine away from an aftertreatment component, such as a Selective Catalyst Reducer, susceptible to deterioration from potentially harmful operational and environmental conditions which an internal combustion engine may encounter. The method includes assessing a status of an operating condition associated with a physical condition of the aftertreatment component of the internal combustion engine, as shown at 702. The status of the operating condition is compared with a threshold value that corresponds with deterioration of the physical condition of the aftertreatment component, shown at 704. If the operating condition exceeds the threshold such that deterioration of the physical condition of the aftertreatment component may occur, then a valve upstream of the aftertreatment component is moved to a first position to open a bypass fluid path that directs exhaust gasses around the component to reduce deterioration of the component, shown at 706. If the operating condition does not exceed the threshold, then the valve is moved to a second position to close the bypass fluid path thereby directing exhaust gasses to the aftertreatment component, shown at 708.

In one aspect, the operating condition is a temperature of the exhaust gasses which is compared to a lower temperature threshold below which an unacceptable amount of unburned hydrocarbons remains in the exhaust gasses. In another aspect, the operating condition is a flow rate of unburned hydrocarbons in the exhaust gasses which is compared to an upper threshold of an unacceptable amount of unburned hydrocarbons in the exhaust gasses. In yet another aspect, the operating is a temperature of the exhaust gasses which is compared to a higher temperature threshold of the exhaust gasses above which the Selective Catalyst Reducer component produces harmful byproducts, such as pentoxides from a vanadia based catalyst, or may otherwise be rendered useless by overheating. In yet another aspect, the operating condition is a chemical formulation of the fuel used by the internal combustion engine which is compared to an upper threshold limit of sulfur content above which the sulfur deteriorates the aftertreatment component. In yet another aspect, the operational condition is a geographical location of the internal combustion engine which is compared to geographical locations that do not require emissions controls for internal combustion engines.

If the operating condition exceeds the threshold such that deterioration of the physical condition of the aftertreatment component may occur, then a valve upstream of the aftertreatment component is moved to a first position to open a bypass fluid path that directs exhaust gasses around the component to reduce deterioration of the component. If the operating condition does not exceed the threshold, then the valve is moved to a second position to close the bypass fluid path thereby directing exhaust gasses to the aftertreatment component.

The step of moving a valve to a first position includes receiving a signal from a controller that directs an actuator associated with the valve to move the valve to the first position. Similarly, the step of moving the valve to the second position 716 includes receiving a signal from the controller directing the actuator to move the valve to the second position.

The step of moving the valve to the first position based on the threshold comparison can be overridden by manually moving the valve to the second position to close the first fluid path and open the second fluid path to bypass the exhaust aftertreatment device.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

Reference throughout this specification to features, advantages, or similar language does not imply that all of the features and advantages that may be realized with the subject matter of the present disclosure should be or are in any single embodiment or implementation of the subject matter. Rather, language referring to the features and advantages is understood to mean that a specific feature, advantage, or characteristic described in connection with an embodiment is included in at least one embodiment of the subject matter of the present disclosure. Discussion of the features and advantages, and similar language, throughout this specification may, but do not necessarily, refer to the same embodiment or implementation.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for protecting an exhaust aftertreatment system of an internal combustion engine from deterioration by selectively diverting exhaust gasses from the internal combustion engine away from a component of an exhaust aftertreatment device of the exhaust aftertreatment system, comprising:
    determining a geographical location of the internal combustion engine;
    determining whether the determined geographical location is a geographical location in which the internal combustion engine is subject to emissions regulations;
    determining a temperature of the exhaust gasses;
    determining whether the determined temperature of the exhaust gasses exceeds an upper temperature limit above which the component produces harmful byproducts;
    moving a valve upstream of the component to a first position to open a bypass fluid path directing exhaust gasses around the component when (i) the determined geographical location is a geographical location in which the internal combustion engine is not subject to emissions regulations, or (ii) the determined temperature of the exhaust gasses exceeds the upper temperature limit above which the component produces harmful byproducts; and
    moving the valve to a second position to close the bypass fluid path thereby directing exhaust gasses to the component when (i) the determined geographical location is a geographical location in which the internal combustion engine is subject to emissions regulations, and (ii) the determined temperature of the exhaust gasses does not exceed the upper temperature limit above which the component produces harmful byproducts.

2. The method of claim 1, further comprising determining a chemical formulation of fuel used by the internal combustion engine; and
    determining whether the chemical formulation includes chemicals that deteriorate the component.

3. The method of claim 2, wherein the chemicals that deteriorate the component include sulfur.

4. The method of claim 1, further comprising:
    overriding the step of moving the valve to the first position when (i) the determined geographical location is a geographical location in which the internal combustion engine is not subject to emissions regulations or (ii) the determined temperature of the exhaust gasses exceeds the upper temperature limit above which the component produces harmful by products, by manually moving the valve to the first position.

5. The method of claim 1, wherein the component is selected from the group consisting of: a selective catalytic reducer, a selective catalytic reduction catalyst-coated filter, a diesel oxidation catalyst (DOC), a diesel particulate filter (DPF), and combinations thereof.

6. An apparatus for bypassing an exhaust aftertreatment device of an internal combustion engine to protect a selective catalytic reducer (SCR) component of the exhaust aftertreatment device from deterioration, the apparatus comprising:
    a flow control valve operable between a first position and a second position to open and close a bypass fluid path wherein exhaust gasses from the internal combustion engine bypass the exhaust aftertreatment device when the flow control valve is in the first position and the exhaust gasses flow through the exhaust aftertreatment device when the flow control valve is in the second position;
    a comparison module configured to:
        determine a geographical location of the internal combustion engine;
        determine whether the determined geographical location is a geographical location in which the internal combustion engine is subject to emissions regulations;
        determine a temperature of the exhaust gasses; and
        determine whether the determined temperature of the exhaust gasses exceeds an upper temperature limit above which the SCR component produces harmful byproducts; and
    a control module configured to:
        move the flow control valve to a first position to open the bypass fluid path when (i) the determined geographical location is a geographical location in which the internal combustion engine is not subject to emissions regulations or (ii) the determined temperature of the exhaust gasses exceeds the upper temperature limit above which the SCR component produces harmful byproducts; and
        move the flow control valve to a second position to close the bypass fluid path when (i) the determined geographical location is a geographical location in which the internal combustion engine is subject to emissions regulations and (ii) the determined temperature of the exhaust gasses does not exceed the upper temperature limit above which the SCR component produces harmful byproducts.

7. The apparatus of claim 6, further comprising a sampling module configured to sample a chemical formulation of fuel used by the internal combustion engine;
wherein the comparison module is further configured to determine whether the chemical formulation includes chemicals that deteriorate the component.

8. The apparatus of claim 7, wherein the chemicals that deteriorate the component include sulfur.

9. The apparatus of claim 6, further comprising:
a user interface associated with the control module configured to accept user input to override the control module control of the flow control valve and manually open the flow control valve to the bypass fluid path to bypass the exhaust aftertreatment device.

10. The apparatus of claim 6, wherein the component comprises a selective catalytic reduction catalyst.

11. The apparatus of claim 6, wherein the component comprises a selective catalytic reduction catalyst coated filter.

12. The apparatus of claim 6, wherein the component comprises a diesel oxidation catalyst.

13. An internal combustion engine system, comprising:
an internal combustion engine;
an exhaust aftertreatment system including an exhaust aftertreatment device comprising a selective catalyst reducer (SCR) component in exhaust receiving communication with the internal combustion engine;
a bypass system operatively associated with the exhaust aftertreatment system operable to cause exhaust gasses to bypass the component;
a flow control valve operable to open and close a bypass fluid path wherein exhaust gasses from the internal combustion engine bypass the exhaust aftertreatment device when the flow control valve is in a first position and the exhaust gasses flow through the exhaust aftertreatment device when the flow control valve is in a second position; and
a controller configured to:
determine a geographical location of the internal combustion engine;
determine whether the determined geographical location is a geographical location in which the internal combustion engine is subject to emissions regulations;
determine a temperature of the exhaust gasses;
determine whether the determined temperature of the exhaust gasses exceeds an upper temperature limit above which the component produces harmful byproducts;
move the flow control valve to the first position when (i) the determined geographical location is a geographical location in which the internal combustion engine is not subject to emissions regulations or (ii) the determined temperature of the exhaust gasses exceeds the upper temperature limit above which the component produces harmful byproducts; and
move the flow control valve to the second position when (i) the determined geographical location is a geographical location in which the internal combustion engine is subject to emissions regulations and (ii) the determined temperature of the exhaust gasses does not exceed the upper temperature limit above which the component produces harmful byproducts;
wherein the bypass system comprises the flow control valve and the bypass fluid path.

14. The system of claim 13, wherein the component comprises a selective catalytic reduction catalyst.

15. The system of claim 13, wherein the component comprises a selective catalytic reduction catalyst coated filter.

16. The system of claim 13, wherein the component comprises a diesel oxidation catalyst.

17. The system of claim 13, further comprising a user interface associated with the controller configured to accept user input to override the controller control of the flow control valve and manually open the flow control valve to the bypass fluid path to bypass the component.

* * * * *